June 25, 1929.  W. DIETER  1,718,539
GYROSCOPIC STEERING MECHANISM
Original Filed April 16, 1926
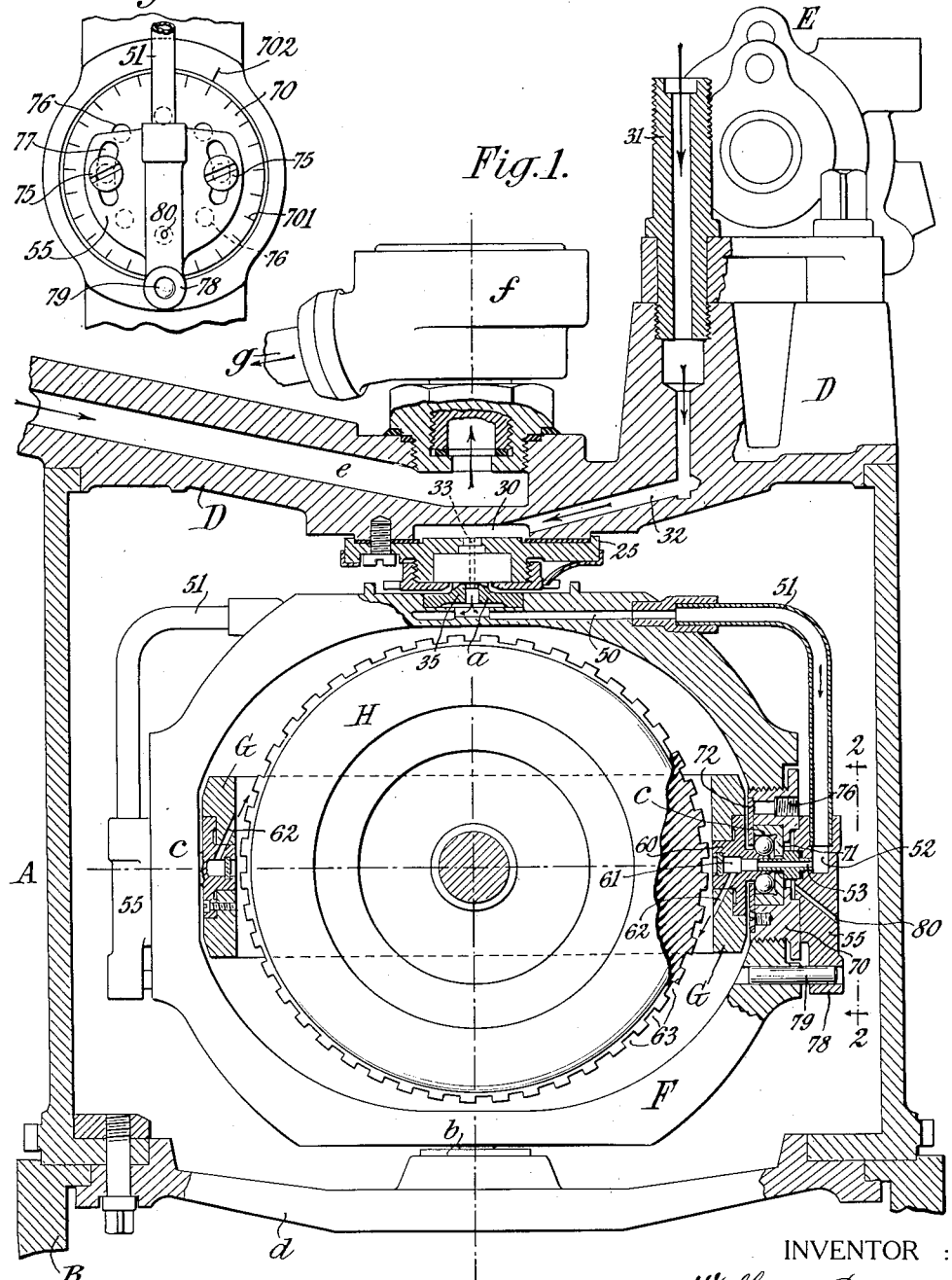
INVENTOR:
William Dieter,
By Attorneys,
Fraser, Myers & Manley Patented June 25, 1929.

1,718,539

UNITED STATES PATENT OFFICE.

WILLIAM DIETER, OF NEWARK, NEW JERSEY, ASSIGNOR TO E. W. BLISS COMPANY, OF BROOKLYN, NEW YORK, A CORPORATION OF DELAWARE.

GYROSCOPIC STEERING MECHANISM.

Original application filed April 16, 1926, Serial No. 102,429. Divided and this application filed January 31, 1928. Serial No. 250,845.

This application is a division of my application filed April 16, 1926, Serial No. 102,429.

This invention relates to gyroscopes for controlling steering mechanisms such as are used for steering automobile torpedoes. In such mechanisms the gyroscope is commonly spun up by the action of compressed air upon a turbine. Within recent years provision has also been made for continuing the spin of the gyroscope to keep it at suitably high speed, by applying jets of air impinging upon the serrated periphery of the fly-wheel.

According to my Patent No. 1,322,232, dated November 18, 1919, the gyroscope is spun up by high pressure air taken directly from the compressed air flask, and during its run is maintained in rotation at the proper speed by low pressure air taken from the reduced pressure side of the usual pressure-reducing valve. According to my Patent No. 1,318,980, dated October 14, 1919, the low pressure air for the latter purpose is taken from the exhaust of either or both the servo-motors or steering engines. My Patent No. 1,440,822, dated January 22, 1923, sets forth means whereby this secondary or low-pressure air for maintaining the spin at proper speed is introduced through the lower of the two bearings on which the outer gimbal ring is hung, is conducted through ducts formed within such outer gimbal ring to the bearings on which the inner gimbal ring is hung within the outer one, and is directed through these bearings to nozzles within such inner gimbal ring from which the air jets impinge upon the toothed periphery of the fly-wheel.

In the actual construction of the Bliss-Leavitt torpedoes as recently built, the low-pressure air has been introduced to the outer gimbal ring at its upper bearing instead of its lower bearing,—a change which involves some simplification of the construction. Some difficulties, however, have been encountered by reason of the leakage of the low-pressure air from such bearing, the air thus leaking impinging upon the outer ring and causing a precessional disturbance of the gyroscope. Similar difficulty has also been encountered by leakage from the two bearings whereon the inner gimbal ring is hung within the outer ring. An object of the present invention is to avoid the latter source of leakage. Other objects of the invention will be made clear as the description proceeds.

The accompanying drawings illustrate the preferred embodiment of the invention.

Figure 1 is an elevation partly in vertical section.

Fig. 2 is a fragmentary view looking from the right in Fig. 1, as indicated by the arrows on the line 2—2 in that figure.

Referring to the drawings, A is the usual gyro cup or casing, mounted as usual upon the base B which is fastened within the torpedo shell; on the top plate or head D of the gyro casing are mounted in the usual manner the motors for vertical and horizontal steering, one of these steering engines being shown at E. Within the casing A is the gyroscope (commonly called gyro) comprising the usual outer gimbal ring F, inner gimbal ring G, and fly-wheel H. The outer gimbal ring is hung within the casing on a vertical axis on bearings $a$ and $b$, and the inner ring is hung within the outer one in bearings $c$, $c$, all in substantially the usual manner. The upper bearing $a$ has its fixed member fastened directly beneath the head D, while the lower bearing $b$ is supported on a lower head or spider $d$, as usual. These four bearings are best made as ball bearings, as is customary.

For the initial spinning up of the gyroscope, high-pressure air taken from the compressed air flask is introduced by a conduit $e$ shown as formed in the head D, and which communicates through a swivel connection $f$ with an outside pipe $g$ leading to the nozzle of the spinning-up turbine. This spinning-up construction is that which is well-known in the Bliss-Leavitt torpedo, and is shown in my Patent No. 1,153,678, dated September 14, 1915, and the patent of F. M. Leavitt, No. 1,185,210, dated May 30, 1916. The present invention has no reference to this initial spinning means. The construction is such that for an angle-fire the gyro casing A may be turned to the desired angle (the head D remaining stationary), and by the turning of the swivel $f$ proper communication is maintained for the high pressure air from the inlet conduit $e$ to the outlet $g$, as is well understood.

The construction of the ball bearing $a$ is not shown in detail and need not be described, because it is fully set forth in my said parent application Serial No. 102,429, to which reference is made. It is sufficient to here state that the bearing is carried by a plate 25 which is fastened against the flat under face of the head D and which itself carries the ball race; the outer ring F is provided with a cone 35, entering within the balls of the ball race. The low-pressure air entering from nipple 31 passes through a duct 32 into a chamber 30 and flows thence through a nozzle 33, shown in dotted lines, into a central bore in the cone, and thence into a passage 50 which is conveniently formed within the body of the outer gimbal ring or partly within such ring and partly by means of tubes 51 exterior thereto, the latter being the preferable construction. The air is thus led to the two inner gimbal ring bearings $c, c$, as will now be described.

The two bearings $c$ are exact counterparts, and a description of one will suffice for both. The tube 51 is soldered or otherwise united to a plate 55 having within it a chamber 52 forming a continuation of the air passage, and from this the air flows through an inner nozzle 53 (similar to the nozzle 33) which discharges into the bore of a cone member 60, which member is seated in the ring G. The cone member 60 has within it a cavity 61 which receives the air, and from which leads off obliquely a duct 62 formed partly in the cone member and partly in the body of the ring G, and which constitutes the discharge nozzle from which the jet of air is caused to impinge upon the teeth or buckets 63 which are fashioned on the surface of the fly-wheel H, whereby the fly-wheel is caused to act as a turbine under the impingement of the jets from the two oblique nozzles 62 on diametrically opposite sides of the fly-wheel. The ball bearing is constructed with a bearing base 70 which is externally threaded and screws into a threaded socket in the outer gimbal F. Within it is socketed the usual ball race 71, the open side of which is partly closed by a ball retainer consisting of a flat washer 72 fastened by small screws against the inner face of the base 70. For adjusting the two bearing cones on diametrically opposite sides of the ring G, it is essential to be able to move the ball race and balls of each bearing toward or from the center or axis of the fly-wheel. For this purpose the bearing base 70 is made bodily adjustable by screwing it in or out on its threaded engagement with the ring F. To maintain such adjustment it is requisite that this base be made fast in any adjusted position to which it is turned. For this purpose the base 70 is clamped fast by set screws 75 (see Fig. 2) which screw into threaded holes 76 in the base, and their heads are clamped tight against the plate 55 which has arc-shaped slots 77 which permit, when the screws 75 are slacked, of turning the base 70 for the purpose of such adjustment; this turning is limited by the length of the slots 77, but if a further adjustment is desired, the screws are withdrawn from the threaded holes in which they are engaged, and screwed into the next holes in advance, the length of the arc-shaped slots 77 being sufficient to at least bridge two such holes. To hold the plate 55 steady, so that it may effectively lock the base 70 against turning, the plate 55 has an extension formed as an ear 78 which fits over a pin 79 fixedly mounted in the ring F. Thus, in making a coarse adjustment the screws 75 are removed and the base turned to bring it to approximately the correct position, and upon completing the fine adjustment the screws 75 are threaded each into one of the holes 76 and then tightened against the plate 55. The screw base 70 has graduations 701 marked upon it with respect to a fixed mark 702 on the ring F (see Fig. 2) so that the extent of adjustment of the bearing may be determined. Thus if the base 70 has 40 threads per inch and is marked with 25 graduations, each of the latter represents an adjustment of 0.001 inch.

It will be observed that the construction of each bearing $c$ is such that no leakage of air flowing from the duct 50, 52, is possible, except through the nozzle 53 into the chamber 61 and thence out through the jet nozzle 62 (except to the extent that a very slight leakage backwardly around the nozzle 53 is possible and cannot be avoided). Heretofore such bearings have had a chamber receiving the compressed air, and from which it was conducted into the cone and thence to the jet nozzle, but from such chamber there has heretofore been a possible path of leakage around screw-threads and any air leaking through such path would jet out and impinge upon the inner ring G, and as such infringement would usually be unsymmetrical, it would cause a precessional disturbance of the gyroscope. Any such disturbance is avoided by the present construction. The only packing required is between the flange of the nozzle 53 and the socket in the plate 55 into which such flange enters, and which contact can be efficiently packed by a gasket, as shown in black section in Fig. 1. Surrounding the flange or thickened part of this nozzle 53 is an annular chamber from which a diagonal vent 80 is provided which may discharge any air which might leak into this chamber from the duct 52 in case of a defective packing back of this flange on the nozzle.

The construction of air ducts through ball bearings thus described effectually solves the problem of conducting the low pressure air to the jet nozzles, from which it impinges upon the fly-wheel to keep it spinning, without permitting any leakage of such air such as might possibly disturb the gyroscope.

The present invention is susceptible of some degree of modification without departing from its essential features as set forth in the subjoined claims.

What I claim is:

1. A gyroscope having air pressure means for maintaining its spin, comprising outer and inner gimbal rings and bearings for mounting the inner ring within the outer ring, and means for conducting air under pressure to said bearings, said bearings comprising each a bearing base mounted in the outer ring and adjustable therein and carrying a ball race, a connection plate receiving the compressed air, fastened directly to said bearing base, a nozzle conducting said air from within said plate into the member mounted in the inner ring, the latter member formed with a cone having a bore entered by said nozzle and a chamber receiving the air therefrom, and a duct conducting air from said chamber and discharging it obliquely against the fly-wheel, whereby the entering air is conducted directly into said cone without possibility of leakage into impingement upon the inner ring.

2. A gyroscope having air pressure means for maintaining its spin, comprising outer and inner gimbal rings and bearings for mounting the inner ring within the outer ring, and means for conducting air under pressure to said bearings, said bearings comprising each a bearing base mounted in the outer ring and adjustable therein and carrying a ball race, a cone member in the inner ring, a nozzle passing through the ball race and discharging air into the cone member, and an outer connection plate applied against the exterior of the bearing base receiving the compresesd air and having packed connection with said nozzle, whereby the air is introduced directly into the nozzle and can not leak around the bearing base to impinge against the inner ring.

3. A gyroscope having air pressure means for maintaining its spin, comprising outer and inner gimbal rings and bearings for mounting the inner ring within the outer ring, and means for conducting air under pressure to said bearings, said bearings comprising each a bearing base mounted in the outer ring and adjustable therein and carrying a ball race, a cone member in the inner ring, and a connection plate having a nonrotative mounting on the outer ring, and having clamping means for fastening to it adjustably the bearing base, whereby the latter may be turned to adjust the ball bearing and made fast with respect to said connection plate.

4. A gyroscope having air pressure means for maintaining its spin, comprising outer and inner gimbal rings and bearings for mounting the inner ring within the outer ring, and means for conducting air under pressure to said bearings, said bearings comprising each a bearing base mounted in the outer ring and adjustable therein and carrying a ball race, a cone member in the inner ring, a nozzle passing through the ball race and discharging air into the cone member, said member having a chamber for receiving such air, and an oblique duct leading therefrom for discharging the air against the flywheel, and the parts formed with a duct for discharging leakage around said nozzle outwardly, so that such leakage cannot impinge upon the inner ring.

5. A gyroscope having air pressure means for maintaining its spin, comprising outer and inner gimbal rings and bearings for mounting the inner ring within the outer ring, and means for conducting air under pressure to said bearings, said bearings comprising each a bearing base mounted in the outer ring and adjustable therein and carrying a ball race, a cone member in the inner ring, a nozzle passing through the ball race and discharging air into the cone member, said member having a chamber for receiving such air, and an oblique duct leading therefrom for discharging the air against the flywheel, and an outer connection applied against the exterior of the bearing base and formed with a duct for discharging outwardly any air leaking around said nozzle.

In witness whereof, I have hereunto signed my name.

WILLIAM DIETER.